(12) United States Patent
Hummelt

(10) Patent No.: US 8,418,727 B2
(45) Date of Patent: Apr. 16, 2013

(54) HYDRAULIC ACCUMULATOR AND METHOD OF MANUFACTURE

(75) Inventor: Edward J. Hummelt, Greenfield, WI (US)

(73) Assignee: Eaton Corporation, Cleveland, OH (US)

( * ) Notice: Subject to any disclaimer, the term of this patent is extended or adjusted under 35 U.S.C. 154(b) by 720 days.

(21) Appl. No.: 12/572,440

(22) Filed: Oct. 2, 2009

(65) Prior Publication Data
US 2010/0084033 A1 Apr. 8, 2010

Related U.S. Application Data

(60) Provisional application No. 61/102,374, filed on Oct. 3, 2008.

(51) Int. Cl.
*F16L 55/04* (2006.01)
(52) U.S. Cl.
USPC .......................................................... 138/30
(58) Field of Classification Search ............... 138/30
See application file for complete search history.

(56) References Cited

U.S. PATENT DOCUMENTS

| | | | |
|---|---|---|---|
| 4,785,956 A * | 11/1988 | Kepler et al. ............... | 220/590 |
| 6,405,760 B1 | 6/2002 | Tranter et al. | |
| 6,478,051 B1 | 11/2002 | Drumm et al. | |
| 6,527,012 B1 | 3/2003 | Weber | |
| 7,318,452 B2 * | 1/2008 | Yoshihara et al. .......... | 138/30 |
| 2001/0037834 A1 * | 11/2001 | Shimbori et al. .......... | 138/31 |
| 2003/0111124 A1 * | 6/2003 | Gray, Jr. .................... | 138/30 |
| 2004/0003854 A1 * | 1/2004 | Kamimura ................ | 138/30 |
| 2009/0095366 A1 * | 4/2009 | Gray, Jr. .................... | 138/30 |
| 2009/0101222 A1 * | 4/2009 | Baltes et al. ............... | 138/30 |
| 2009/0107570 A1 * | 4/2009 | Weber ........................ | 138/30 |

FOREIGN PATENT DOCUMENTS

| | | |
|---|---|---|
| DE | 10142038 A1 | 9/2002 |
| DE | 10347884 B3 | 6/2005 |
| EP | 0266971 A2 | 6/1988 |
| GB | 884079 A | 12/1961 |
| GB | 2134984 A | 8/1984 |
| JP | 2005095983 A | 4/2005 |

OTHER PUBLICATIONS

International Search Report and Written Opinion from the International Searching Authority for International Application No. PCT/US2009/059359, mailed Jan. 11, 2010.

* cited by examiner

*Primary Examiner* — James Hook
(74) *Attorney, Agent, or Firm* — Quinn Law Group, PLLC

(57) ABSTRACT

An accumulator for a hydraulic system includes a polymer liner defining a cavity. A metal bellows assembly is housed in the cavity and separates the cavity into a first chamber and a second chamber, with the first and second chambers isolated from one another by the bellows assembly. A composite shell substantially encases the liner. The liner and shell are configured so that the first chamber receives hydraulic fluid from and delivers hydraulic fluid through an opening in the liner and the shell as the bellows assembly expands and compresses due to pressurized gas in the second chamber balancing fluid pressure changes in the first chamber. In one embodiment, the metal bellows assembly includes hydroformed bellows.

13 Claims, 6 Drawing Sheets

HYDRAULIC ACCUMULATOR AND METHOD OF MANUFACTURE

CROSS-REFERENCE TO RELATED APPLICATIONS

This application claims the benefit of U.S. Provisional Patent Application Ser. No. 61/102374, filed Oct. 3, 2008, which is hereby incorporated by reference in its entirety.

TECHNICAL FIELD

The invention relates to a hydraulic accumulator, such as a hydraulic accumulator for a hydraulic vehicle, and a method of manufacturing a hydraulic accumulator.

BACKGROUND OF THE INVENTION

Hydraulic accumulators are energy storage devices that maintain a reserve of pressurized fluid to be provided to a hydraulic system when fluid pressure in the system drops. One type of hydraulic accumulator uses precharged gas that maintains pressure against fluid in the accumulator, forcing some fluid out of the accumulator and into a hydraulic system line when fluid pressure drops. When fluid pressure in the hydraulic system rises, fluid reenters the accumulator to maintain a reserve. Hydraulic accumulators help to balance pressure fluctuations in the hydraulic system.

SUMMARY OF THE INVENTION

An accumulator for a hydraulic system includes a polymer liner defining a cavity. A metal bellows assembly is housed in the cavity and separates the cavity into a first chamber and a second chamber, with the first and second chambers isolated from one another by the bellows assembly. A composite shell substantially encases the liner. The liner and shell are configured so that the first chamber receives hydraulic fluid from and delivers hydraulic fluid through an opening in the liner and the shell as the bellows assembly expands and contracts due to pressurized gas in the second chamber balancing fluid pressure changes in the first chamber.

In one embodiment, the metal bellows assembly includes hydroformed bellows. Hydroformed bellows may be less expensive than metal bellows made from separate metal discs welded to one another. Furthermore, bellows hydroformed from a metal tube result in no scrap metal, unlike welded bellows where the center of each disc is stamped out and removed.

Preferably, the first chamber (i.e., the fluid chamber) is open to and partially defined by the polymer liner and the second chamber (i.e., the gas chamber) is isolated from the liner by the metal bellows assembly. Configuring the accumulator with the gas inside of the bellows has several advantages. First, it allows the liner to be a relatively low cost polymer, rather than metal. A polymer liner is less desirable if the gas chamber is outside of the bellows, as polymers are generally not impervious to gasses. The present accumulator is designed to be maintenance-free for life, as a precharge of gas in the gas chamber will not require recharging. Second, it avoids the need to fully compress the bellows and therefore allows for the use of a formed instead of edge welded bellows. Third, for delivery of given fluid volume, it reduces the strain range (minimum to maximum extended length) of the bellows thereby improving bellows fatigue life.

Optionally, one or more guide features, such as polymer rings, are nested between the bellows assembly and the liner to substantially prevent contact of the bellows assembly with the liner, thus reducing fatigue wear.

In order to provide strength to the accumulator without adding undue weight, the composite shell may be a fiber reinforced composite with one or more of carbon, glass and aramid fiber in a binder base, such as a thermoplastic or thermoset resin. The fiber shell may be overwrapped on the liner after the bellows are inserted. An accumulator with a polymer liner and a composite shell typically requires a bladder to be used as the barrier (instead of bellows), as the bladder can be fit through an end opening in the liner and shell while bellows cannot collapse beyond their fixed diameter. To overcome this limitation, a multi-piece liner is used with a tubular center portion and separate end portions that are welded or otherwise connected with the center portion after installation of the bellows.

A method of manufacturing the hydraulic accumulator described above includes hydroforming metal annular bellows, securing metal end caps to opposing ends of the bellows, such as by welding, and then placing the bellows within a tubular polymer liner portion. Polymer end portions of the liner are then secured to opposing ends of the tubular portion by thermoplastic welding to enclose the bellows within the liner. The thermoplastic polymer liner is then covered with a composite material.

The tubular polymer liner portion may be formed by extrusion. The polymer liner end caps may be formed by injection or compression molding around structural, load bearing polar rings. One of the bellows end caps is secured to one of the polymer end portions so that the other bellows end cap is movable within the liner toward an opening (i.e., a fluid port) through the liner and the composite.

Covering the liner with a composite may be accomplished by overwrapping the liner with a composite of carbon fiber, fiberglass or aramid fiber. Alternatively, a braided composite may be pulled over the liner.

The combination of metal bellows, a polymer liner, and a composite overwrap provides a low cost, maintenance free and lightweight hydraulic accumulator especially suitable for use in a hydraulic automotive vehicle, although its use is not limited to such.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
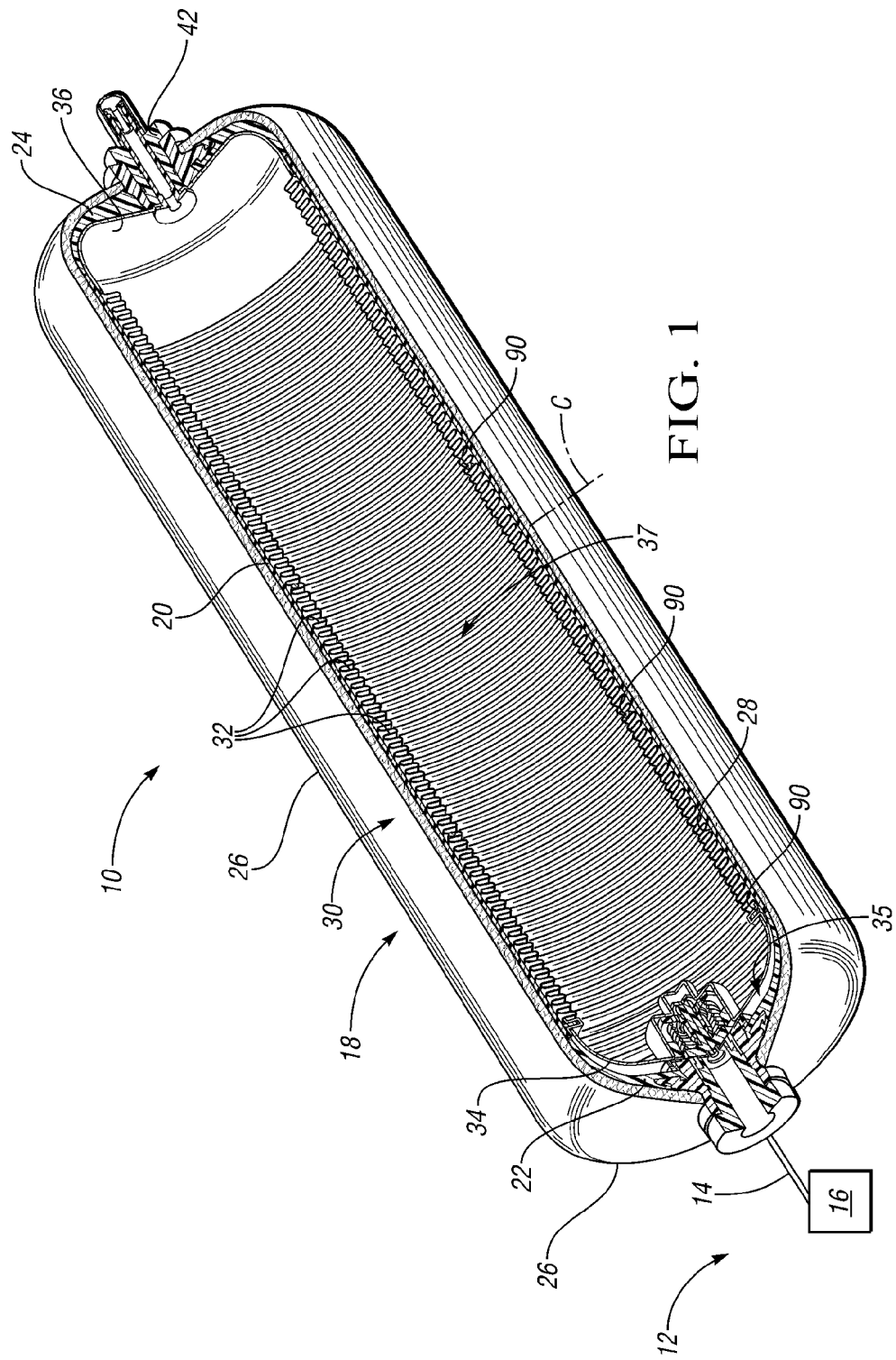
FIG. 1 is a schematic perspective illustration in partial cross-section view of one embodiment of a hydraulic accumulator.

Referring to the drawings, wherein like reference numbers refer to like components throughout the several views, FIG. 1 shows a hydraulic accumulator 10 that is part of a hydraulic system 12. The accumulator 10 is in fluid communication with the remainder of the hydraulic system, represented at 16, via a fluid line 14. As is readily understood by those skilled in the art, the accumulator 10 acts as an energy storage device to provide a reserve of hydraulic fluid to the remainder of the system 16 when pressure in line 14 drops. The accumulator 10 described herein is configured as a low cost, maintenance-free and lightweight accumulator, appropriate for a variety of hydraulic systems, including hydraulic automotive vehicles.

The accumulator 10 has a pressure vessel 18 that is a multi-piece polymer liner 20, 22, 24 with a composite shell 26 overlaying the liner 20, 22, 24. The multi-piece liner includes a tubular portion 20 and two polymer end portions 22, 24. Preferably, the tubular portion 18 is extruded polymer, while the end portions 22, 24 are injection molded polymer. The liner 20, 22, 24 lines an inner surface 29 (see FIG. 2) of the composite shell 26.

The liner 20, 22 and 24 and shell 26 define an interior cavity 28 in which is housed a metal bellows assembly 30. The bellows assembly 30 includes metal bellows 32, which are preferably hydroformed instead of welded, with metal end caps 34, 36 welded to either end of the bellows 32. The bellows 32 and end caps 34, 36 may be any suitable metal, including metal alloys, such as stainless steel alloy 321, INCONEL®, marketed and sold by Special Metals Corporation of Huntington, W.V.

The bellows assembly 30 divides the cavity 28 into a first chamber 35 and a second chamber 37. The first chamber 35 is defined by the volume of the cavity 28 outside of the bellows 32, between the bellows assembly 30 and the liner 20, 22, 24. The second chamber 37 is defined by the volume of the cavity inside of the bellows assembly 30. The bellows assembly 30 is fixed at one end cap 36 (the end cap 36 secured to the end portion 24), with the end cap 34 free to collapse and expand within the cavity 28 toward the end portion 22 as described below.

Figure 3:
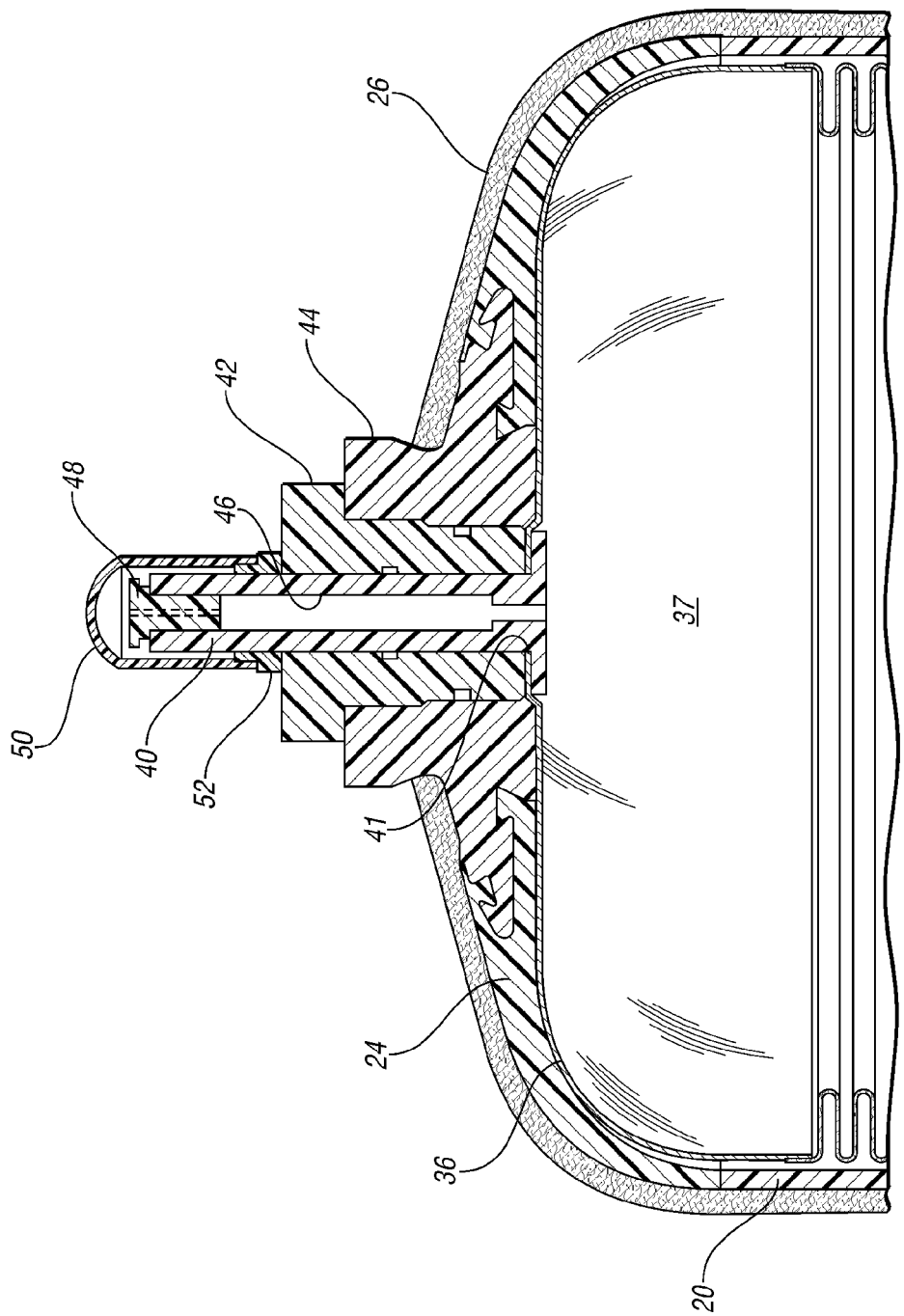
FIG. 3 is a schematic illustration in cross-sectional view of an opposing end of the accumulator with a gas port for initial charging of a gas chamber.

Referring to FIG. 3, the end cap 36 is secured to the end portion 24 via a bellow stem 40 which extends through a gas port 42 secured to a polar ring 44 molded into the end portion 24. The bellow stem 40 has a center passage 46 extending therethrough. The bellow stem 40 is secured at an opening 41 in the end cap 36. A one-way valve 48 is secured to the end of the bellow stem 40 and is openable to receive charging gas from a gas supply (not shown) to precharge the second chamber 37 with an inert gas. The valve 48 is covered by a cap 50 and sealed to the bellow stem 40 with a seal 52 so that the gas in the second chamber 37 may not escape. The second chamber 37 may also be referred to as a gas chamber.

Figure 2:
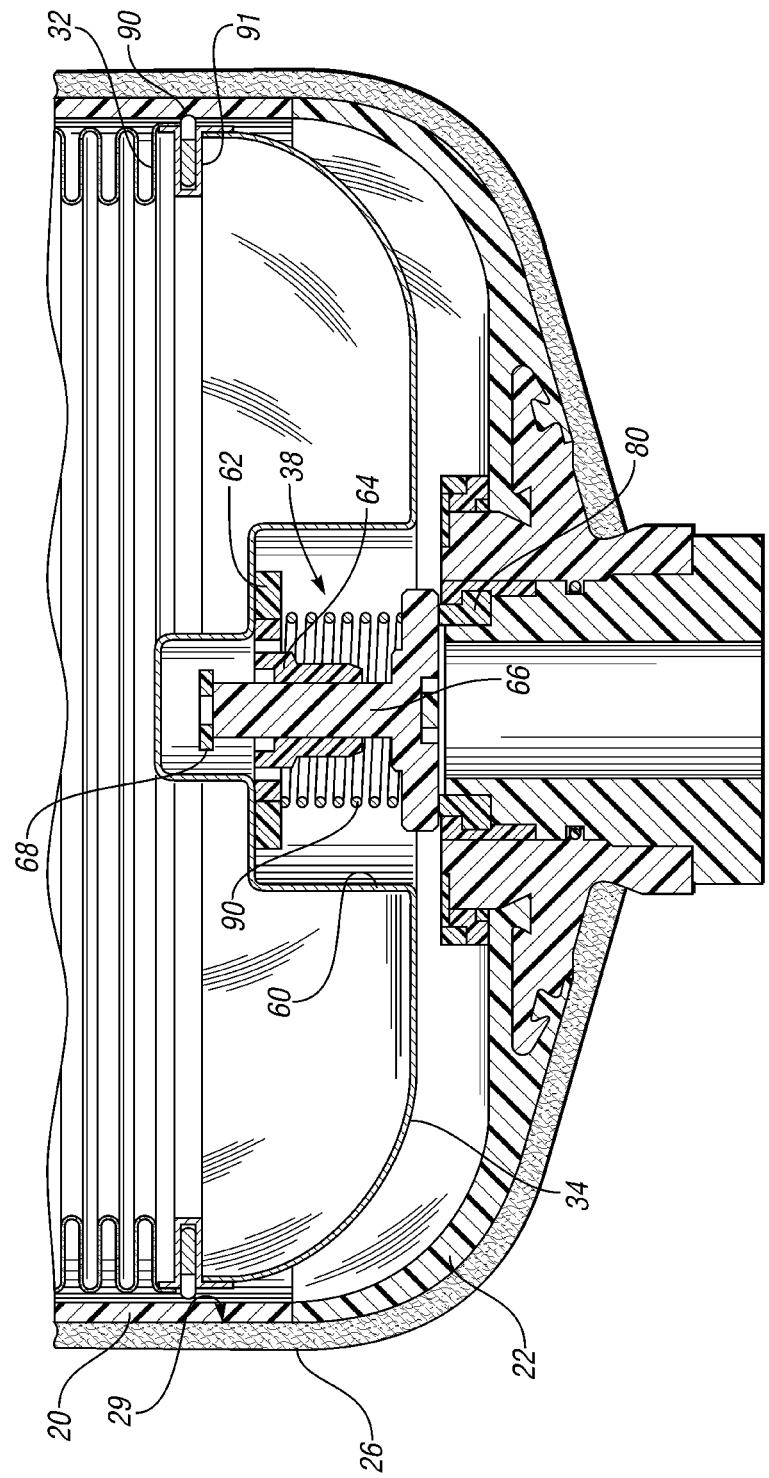
FIG. 2 is a schematic illustration in cross-sectional view of an end of the accumulator with a fluid port for connection to a hydraulic system, and showing a fluid retention system closed and the bellows in a fully extended position.

Referring to FIG. 2, the end cap 34 supports a fluid retention mechanism 38 partially within a recess 60 formed in the end cap 34. A collar 62 is secured to the end cap 34 and supports a guide plate 64 through which a poppet 66 slides. A retainer 68 is secured to one end of the poppet 66 and limits movement of the poppet 66 between the open position shown in FIG. 4 and the closed position shown in FIGS. 1 and 2. As an alternative, the fluid retention system 38 may be mounted inside the fluid port 70 instead of the the bellows end closure 34 thus simplifying end closure 34.

Figure 4:
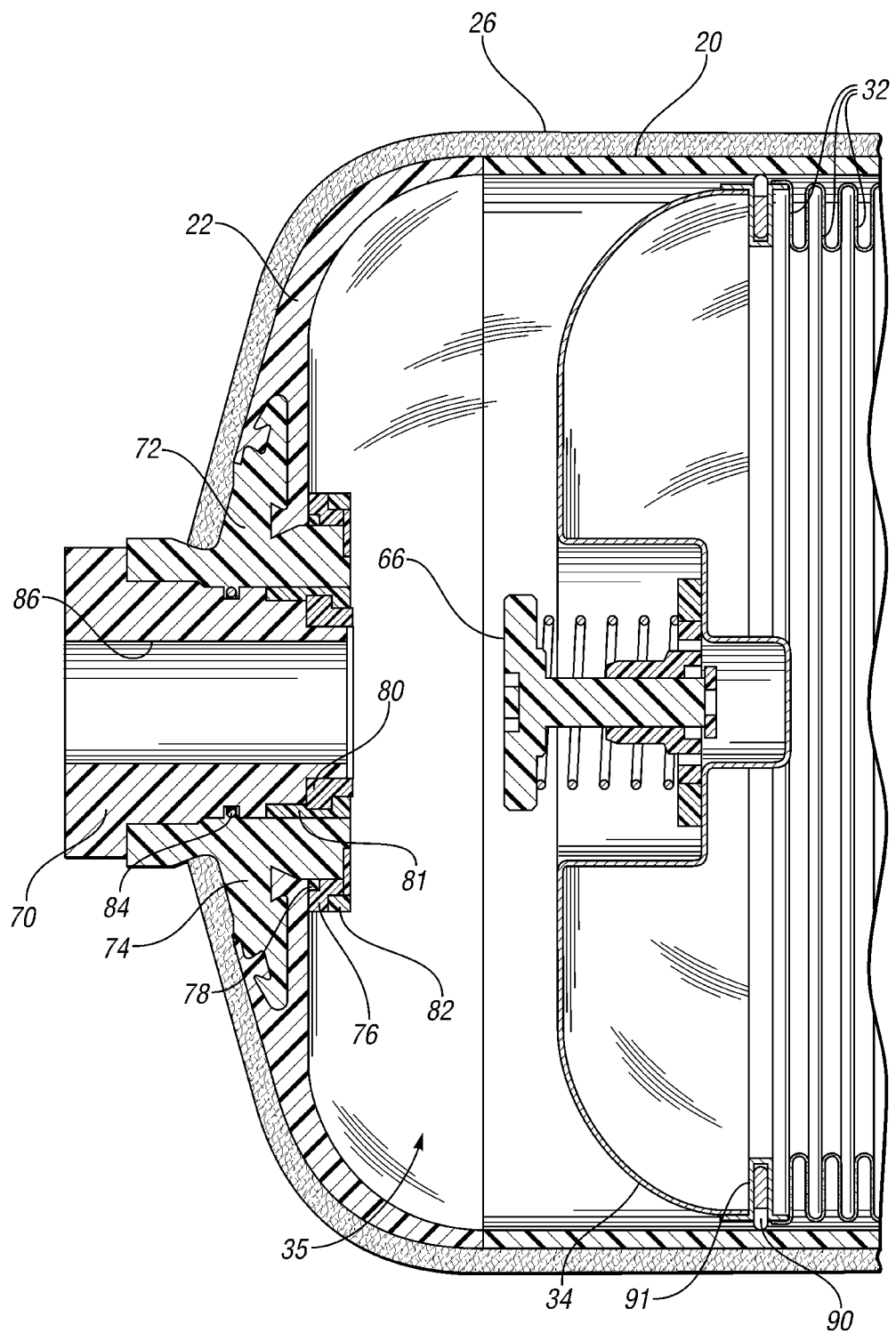
FIG. 4 is a schematic illustration in cross-sectional view of the accumulator end of FIG. 2 with the fluid retention system opened and the bellows in a partially compressed position.

Referring to FIG. 4, a hydraulic fluid port 70 is secured at an opening 72 in the end portion 22 and the shell 26 with a polar ring 74 molded to the end portion 22. A collar 76 helps secure the fluid port 70 and polar ring 74 to the end portion 22. A ring seal 78 seals between the collar 76 and the polar ring 74. A primary seal ring 80, a primary seal retaining ring 81, a secondary seal ring 82 and an O-ring seal 84 help to seal the fluid chamber 35.

In the open position shown in FIG. 4, the poppet 66 does not cover an opening 86 through the fluid port 70. Thus, fluid in the first chamber 35 is in communication with fluid in line 14 of FIG. 1, and flows to the remainder 16 of the hydraulic system 12 when fluid pressure in line 14 drops below the gas pressure in the gas chamber 37, with the bellows 32 expanding toward the fluid port 70 to displace fluid from the chamber 35. The second chamber 37 thus expands in volume as fluid is displaced from the first chamber, with gas pressure in the second chamber 37 falling as the bellows 32 expand. The extreme expanded position of the bellows 32 is shown in FIGS. 1 and 2. In the extreme expanded position, also referred to as the closed position, the poppet 60 contacts the seal ring 80 at the fluid port 70, covering the opening 86. The poppet 66 is held in position against the seal ring 80 by compression of a spring 90 positioned between the collar 62 and the poppet 66.

The fluid retention mechanism 38 is configured so that in the extreme expanded position of the bellows 32 and the closed position of the poppet 66, the end portion 34 does not contact the end cap 22, so that the first chamber 35 has some minimum retained volume of hydraulic fluid to counteract the gas pressure in the second chamber 37 even when no external fluid pressure exists in line 14, thus reducing the pressure differential between the chambers 35, 37 that can occur across the bellows assembly 30 to tolerable levels (i.e., levels that do not compromise the structural integrity of bellows assembly 30). Referring to FIG. 1, preferably the bellows 32 are configured with a stiffness that allows them to be collapsed to about one half of the fully expanded position shown in FIG. 1, to about line C. Thus, the extension ratio of the bellows 32, i.e., the ratio of the expanded, maximum length in the closed position of FIGS. 1 and 2 to the compressed, minimum length (length when compressed to line C) is about 2.0.

Optional guide features 90 are nested between the bellows 32 and the liner 20, 22, 24. In this embodiment, the guide features 90 are rings that help keep the bellows 32 centered, preventing contact wear with the liner 20, 22, 24. The guide rings 90 have apertures or other geometry that allows for fluid flow past the ring. Each guide ring 90 may also have a separate carrier 91 welded to the bellows 32. As shown in FIG. 2, the end cap 34 is welded to the carrier 91, which, in turn, is welded to the bellows 32.

By designing the accumulator 10 with the fluid chamber (i.e., first chamber 35) outside of the bellows assembly 30 and the gas chamber (i.e., second chamber 37) inside of the bellows assembly 30, the desired minimum volume of retained fluid is achieved with a much smaller extension ratio than would be possible if the fluid chamber were inside of the bellows assembly 30 and the gas chamber outside of the bellows assembly 30. In that case, the bellows 32 would need to collapse to an overall height equal to the distance between the end cap 22 and the end portion 34 of FIG. 2. Because hydroformed bellows do not generally achieve as great a ratio of maximum length to minimum length as welded bellows (i.e., cannot collapse to as small a portion of their full extended length), the configuration of the gas inside of the bellows 32 and the fluid outside of the bellows 32 is especially suitable for the hydroformed bellows 32. In comparison to an accumulator with welded bellows, for the same pressure range and volume ratio, the minimum collapsed length of the bellows 32 is longer, leading to higher bellows fatigue life.

Furthermore, by containing the gas in the second chamber 37 (inside of the bellows 32), a polymer liner 20, 22, 24 can be used regardless of its permeability to gas, as the gas is not in contact with the liner 20, 22, 24.

The composite shell 26 encases the liner 20, 22, 24 to provide strength and integrity. The composite shell 26 is a composite of high strength yet lightweight fibers, such as carbon fibers, fiberglass, or aramid fibers in a binder base. The shell 26 may be filament or tape of the composite material wound around the assembled liner 20, 22, 24. The combination of metal hydroformed bellows 32, a polymer liner 20, 22, 24 and a composite shell 26 provides a low cost, maintenance-free and lightweight accumulator 10 suitable for many applications.

Figure 5:
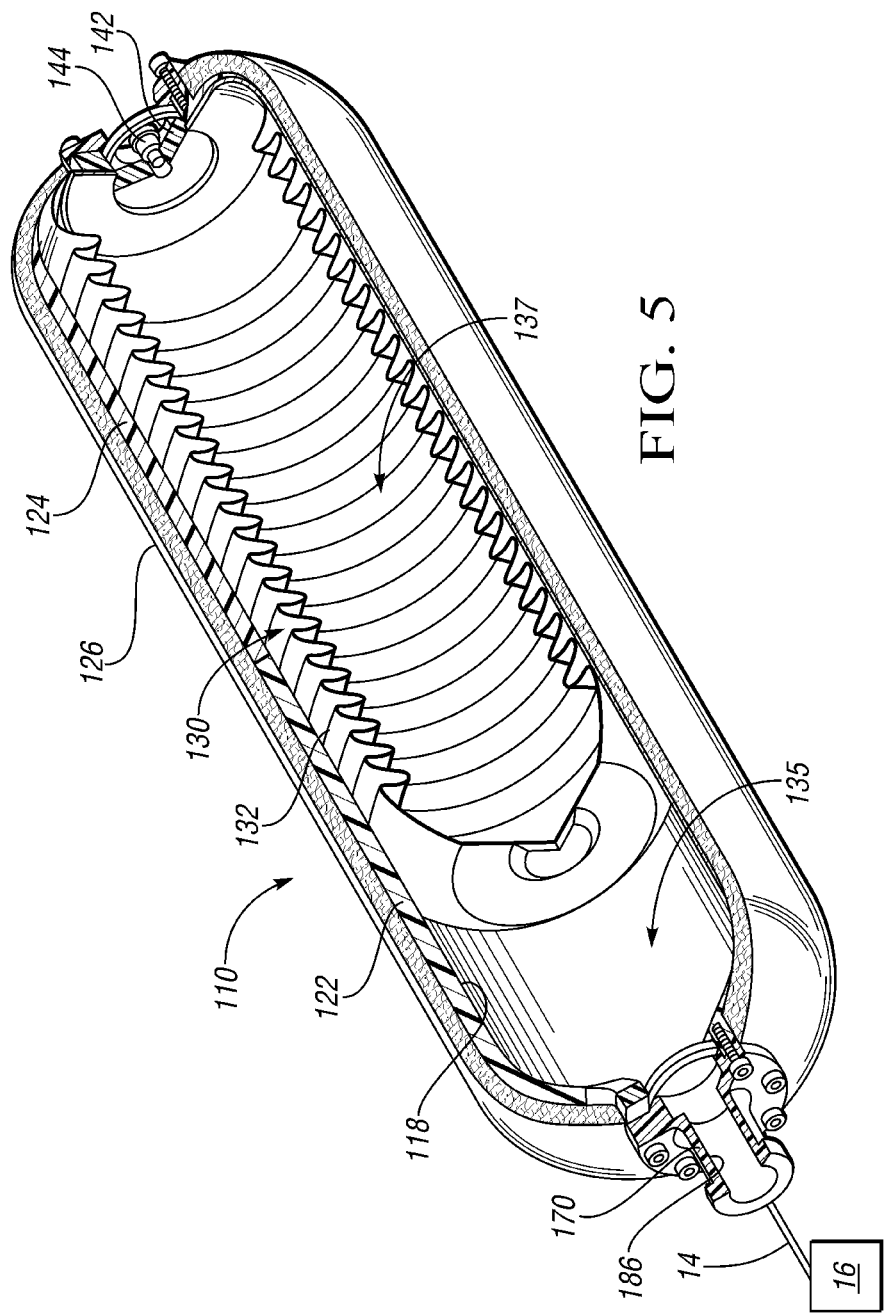
FIG. 5 is a schematic perspective illustration in partial cross-sectional view of another embodiment of a hydraulic accumulator.

Referring to FIG. 5, another embodiment of an accumulator 110 is shown. The accumulator 110 also has hydroformed bellows 132 as part of a bellows assembly 130 contained in a cavity 118 defined by a multi-piece polymer liner 122, 124 (two-piece liner) and a composite shell 126 of similar material and construction as described above with respect to accumulator 10. A first (fluid) chamber 135 is in fluid communication with an opening 186 in a fluid port 170 for providing a reserve of fluid to a remainder 16 of a hydraulic system, such as hydraulic system 12 of FIG. 1, through fluid line 14 with the bellows 132 expanding and contracting against gas pressure in a second (gas) chamber 137 inside of the bellows assembly 130. A gas port 142 supports a one-way valve 144 for receiving gas from a gas supply to precharge the second chamber 137 to a desired gas pressure when a predetermined amount of fluid is in the first chamber 135. The accumulator 110 does not have a fluid retention mechanism shown at the fluid port 170 to maintain a minimum fluid volume in the first chamber 135, but a fluid retention mechanism such as mechanism 38 of FIG. 1 could be incorporated into the accumulator 110.

Figure 6:
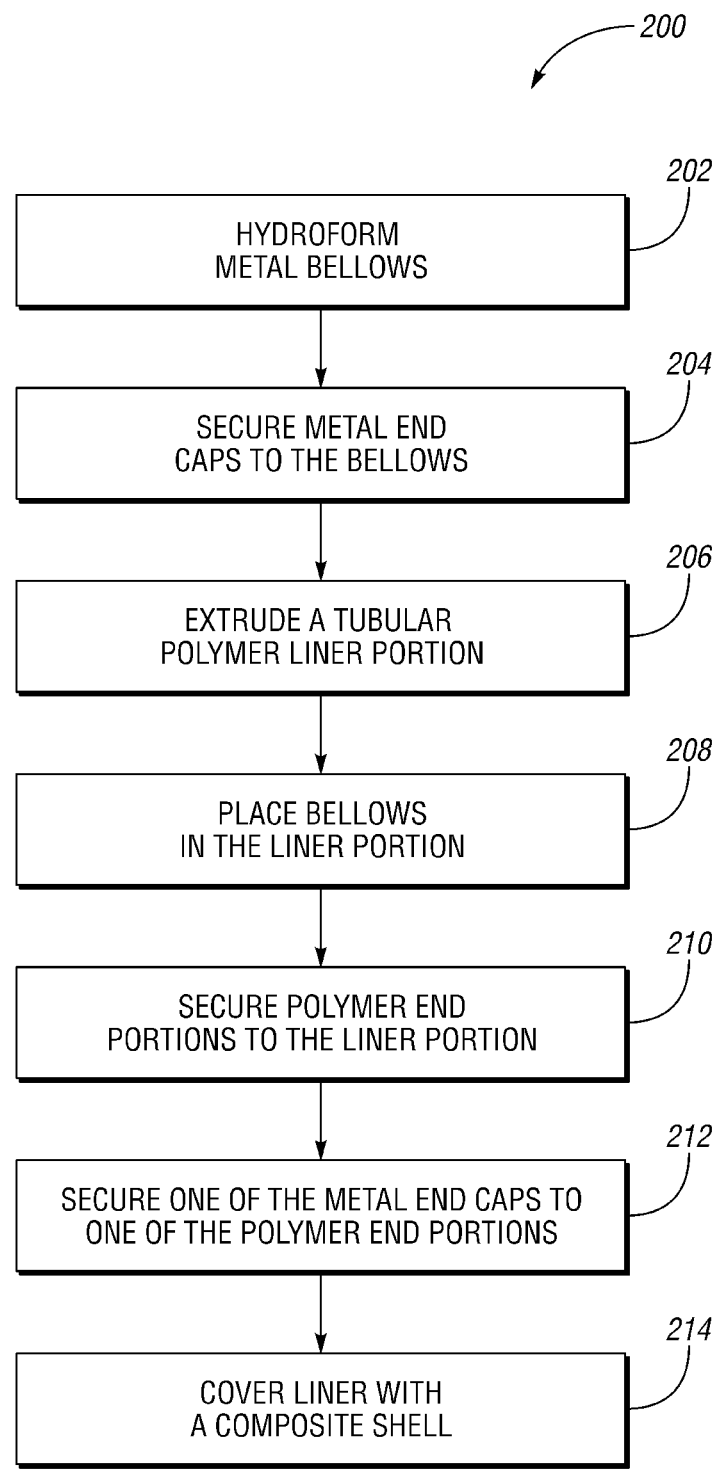
FIG. 6 is a flow diagram of a method of manufacturing the accumulators of FIGS. 1-5.

Referring to FIG. 6, a flow diagram illustrates a method 200 of manufacturing a hydraulic accumulator such as accumulators 10 and 110 described above. The method 200 is described with respect to accumulator 10, but is not limited to manufacture of only accumulator 10. In step 202 of the method, metal bellows 32 are hydroformed. Thus, the collapsible and extendable bellows 32 may be and preferably are one continuous piece, with no welding required of individual bellows to one another.

In step 204, metal end caps 34, 36 are secured to the metal bellows 32, preferably by welding. Before, after or contemporaneously with steps 202 and 204, a tubular polymer liner portion 20 is extruded in step 206. The bellows assembly 30 (i.e., the hydroformed metal bellows 32 with end caps 34, 36) is placed in the liner portion 20 in step 208. Polymer end portions 22, 24 are secured to the liner portion 20 in step 210 to complete the liner. In step 212, one of the metal end caps 36 is then secured to the polymer end portion 24, such as by a gas port 42 and polar ring 44 with a bellows stem 40 secured through an opening 41 in the end cap 36. Finally, in step 214, the liner 20, 22, 24 is covered with a composite shell 26, such as by overwrapping, filament winding or tape lay up. The completed accumulator 10 is now ready for gas precharging and connection with a fluid line 14 of a hydraulic system 12.

While the best modes for carrying out the invention have been described in detail, those familiar with the art to which this invention relates will recognize various alternative designs and embodiments for practicing the invention within the scope of the appended claims.

The invention claimed is:

1. An accumulator for a hydraulic system comprising:
   a multi-piece polymer liner defining a cavity; wherein the multi-piece polymer liner includes a piece that is a straight tubular portion and includes end portions attached to the tubular portion;
   a metal bellows assembly housed in the cavity and separating the cavity into a first chamber and a second chamber, with the first and second chambers isolated from one another by the bellows assembly;
   a composite shell substantially encasing the liner;
   wherein the liner and shell are configured so that the first chamber receives hydraulic fluid and delivers hydraulic fluid through an opening in the liner and the shell as the bellows assembly expands and compresses due to pressurized gas in the second chamber balancing changes in fluid pressure in the first chamber.

2. The accumulator of claim 1, wherein the metal bellows assembly includes hydroformed bellows.

3. The accumulator of claim 1, wherein the first chamber is open to and partially defined by the liner and the second chamber is isolated from the liner by the metal bellows assembly.

4. The accumulator of claim 1, wherein the composite shell is a fiber composite with at least one of carbon fiber, fiberglass and aramid fiber.

5. The accumulator of claim 1, wherein the metal bellows assembly includes bellows with end caps secured to the bellows; and further comprising:
   a guide ring nested between the bellows assembly and the liner to prevent contact of the bellows assembly with the liner;
   a carrier connected to the bellows; and
   wherein the guide ring is supported by the carrier.

6. The accumulator of claim 1, wherein the metal bellows assembly includes bellows with end caps secured to the bellows.

7. The accumulator of claim 1, wherein the metal bellows assembly includes bellows with end caps secured to the bellows; and further comprising:
   a bellow stem securing one of the end caps to one of the end portions; wherein the bellow stem has a passage; and
   a one-way valve secured to the bellow stem and openable to permit pressurized gas into the second chamber through the passage.

8. An accumulator comprising:
   a pressure vessel with:
      a composite shell defining a cavity with an opening; and
      a multi-piece polymer liner lining an inner surface of the shell to substantially isolate the cavity from the composite shell; wherein the multi-piece polymer liner includes a piece that is a straight tubular portion and includes end portions attached to the tubular portion;
   a metal bellows assembly housed in the cavity and separating the cavity into a hydraulic fluid chamber and a gas chamber, with the hydraulic fluid chamber outside of the bellows assembly and in communication with the opening in the vessel, and with the gas chamber inside of the metal bellows assembly and not in contact with the polymer liner; and
   wherein the bellows assembly contracts and expands due to pressurized gas in the gas chamber balancing changes in fluid pressure in the fluid chamber.

9. The accumulator of claim 8, wherein the metal bellows assembly includes hydroformed bellows.

10. The accumulator of claim 8, wherein the composite shell is a fiber composite with at least one of carbon fiber, fiberglass and aramid fiber.

11. The accumulator of claim 8, wherein the metal bellows assembly includes bellows with end caps secured to the bellows; and further comprising:
   a guide ring nested between the bellows assembly and the liner and movable with the bellows assembly to prevent contact of the bellows assembly with the liner;
   a carrier connected to the bellows; and
   wherein the guide ring is supported by the carrier.

12. The accumulator of claim 8, wherein the metal bellows assembly includes bellows with end caps secured to the bellows.

13. The accumulator of claim 8, wherein the metal bellows assembly includes bellows with end caps secured to the bellows; and further comprising:
   a bellow stem securing one of the end caps to one of the end portions; wherein the bellow stem has a passage; and
   a one-way valve secured to the bellow stem and openable to permit pressurized gas into the second chamber through the passage.

* * * * *